(12) United States Patent
Wurtenberger et al.

(10) Patent No.: US 10,158,415 B1
(45) Date of Patent: Dec. 18, 2018

(54) MACRO BASE STATION TO MANAGE A FREQUENCY LIST

(71) Applicant: Sprint Communications Company L.P., Overland Park, KS (US)

(72) Inventors: Andrew Mark Wurtenberger, Olathe, KS (US); Sreekar Marupaduga, Overland Park, KS (US); Bryan Timothy Barbee, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 62 days.

(21) Appl. No.: 15/498,996

(22) Filed: Apr. 27, 2017

(51) Int. Cl.
*H04B 7/14* (2006.01)
*H04W 72/00* (2009.01)
*H04W 88/02* (2009.01)
*H04W 88/08* (2009.01)

(52) U.S. Cl.
CPC ............ *H04B 7/14* (2013.01); *H04W 72/005* (2013.01); *H04W 88/02* (2013.01); *H04W 88/08* (2013.01)

(58) Field of Classification Search
CPC ..... H04W 48/12; H04W 48/16; H04W 48/18; H04W 48/20; H04W 88/06; H04W 84/047; H04W 88/04; H04B 10/29; H04B 10/2937; H04B 2210/256; H04B 3/36; H04B 3/58; H04B 7/14; H04B 7/145; H04B 7/15; H04B 7/155; H04J 1/10; H04L 12/60; H04L 13/12; H04L 2001/0097; H04L 25/20; H04L 25/24; H04L 25/44; H04L 29/12566; H04L 61/2589; H04Q 2213/13191; H04Q 2213/191; H04Q 2213/218; H04Q 3/0008; H04Q 3/0012

See application file for complete search history.

(56) References Cited

U.S. PATENT DOCUMENTS

| 8,391,860 | B2 | 3/2013 | Jung et al. | |
| 2009/0098871 | A1* | 4/2009 | Gogic | H04W 48/18 455/435.1 |
| 2009/0215452 | A1* | 8/2009 | Balasubramanian | H04W 48/16 455/434 |
| 2012/0309394 | A1* | 12/2012 | Radulescu | H04W 28/18 455/436 |
| 2016/0219454 | A1* | 7/2016 | Sawai | H04W 16/08 |

\* cited by examiner

*Primary Examiner* — Sharad Rampuria (57) ABSTRACT

A method of operating a macro base station to manage a frequency list. The frequency list includes frequencies for the macro base station and a plurality of wireless relays that serve User Equipment (UEs). The method includes wireless relays monitoring the frequency list broadcasted by the macro base station to determine if their associated frequencies are included in the frequency list. The method further includes, if a wireless relay determines its associated frequency is not included in the frequency list, then the wireless relay transferring a message to the macro base station to add its associated frequency.

20 Claims, 6 Drawing Sheets

MACRO BASE STATION TO MANAGE A FREQUENCY LIST

TECHNICAL BACKGROUND

Wireless communication networks exchange user data between communication devices to facilitate various data services, like Internet access, voice calling, video calling, audio streaming, media streaming, gaming, data messaging, and the like. Wireless communication networks allow users to move about as they communicate. A popular form of wireless communication network is Long Term Evolution (LTE). Wireless relays are used to extend the coverage area of wireless networks including LTE networks.

The wireless relays serve user devices and exchange user data with a macro base station or another network gateway. In LTE networks, femto-cell relays and pico-cell relays exchange user data and user signaling over the air between User Equipment (UE) and eNodeBs. The wireless relays also exchange data and signaling between the UEs and a Secure Gateway (Se-GW) over a Local Area Network/Wide Area Network (LAN/WAN). These wireless relay communications use various combinations of Ethernet, Data over Cable System Interface Specification (DOCSIS), Wave Division Multiplex (WDM), Wireless Fidelity (WIFI), Long Term Evolution (LTE), WIFI/LTE Aggregation (LWA), or some other data communication protocol.

Frequency coordination is necessary to ensure proper interoperability between the wireless relays and the macro base station. In addition, the broadcast frequency of a wireless relay needs to be included in the frequency list broadcasted by the macro base station so that UEs can scan for and discover the wireless relay for attachment.

Overview

Examples disclosed herein provide a system, method, hardware, and software to manage a frequency list broadcasted by a macro base station. The method includes wireless relays monitoring the frequency list broadcasted by the macro base station to determine if their associated frequencies are included in the frequency list. The method further includes, if a wireless relay determines its associated frequency is not included in the frequency list, then the wireless relay transfers a message to the macro base station to add its associated frequency.

In another example, a data communication system comprising a macro base station and a plurality of wireless relays serve User Equipment (UEs). The macro base station wirelessly broadcasts a frequency list. The wireless relays monitor the frequency list to determine if their associated wireless relay frequency is included in the frequency list. When a wireless relay determines its associated wireless relay frequency is not included in the frequency list, then the wireless relay transfers a message to the macro base station to add its associated wireless relay frequency.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention, and that the features described below can be combined in various ways to form multiple variations of the invention. As a result, the invention is not limited to the specific examples described below, but only by the claims and their equivalents.

Figure 1:
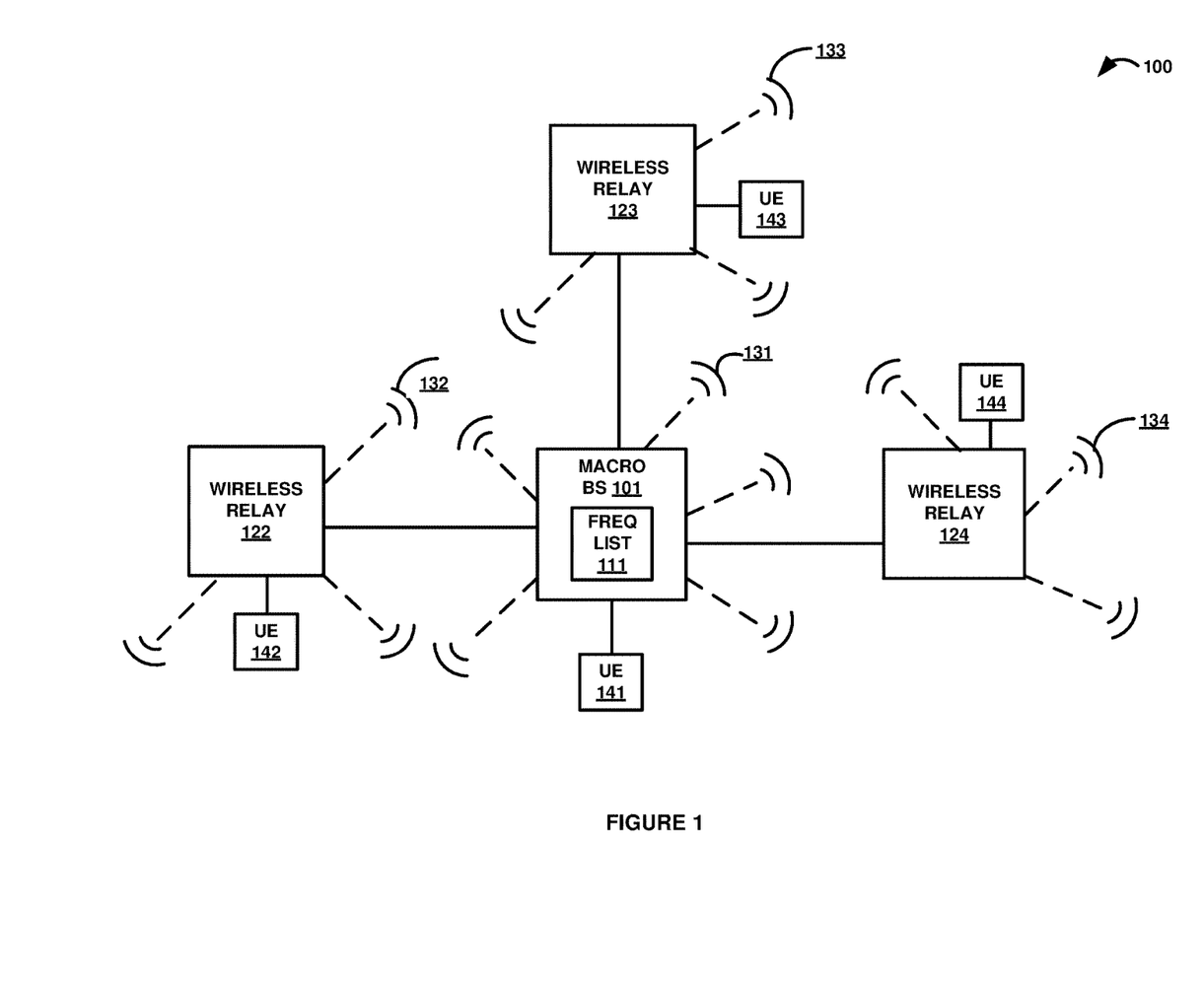
FIG. 1 illustrates a data communication network to manage a frequency list.

FIG. 1 illustrates data communication network 100 to manage frequency list 111. Data communication network 100 includes macro base station 101, wireless relays 122-124, and UEs 141-144. Wireless relays 122-124 broadcast over wireless relay frequencies 132-134, respectively. Macro base station 101 broadcasts over frequency 131 and includes frequency list 111. UE 141 is attached to macro base station 101. UEs 142-144 are attached to wireless relays 122-124, respectively. Data communication network 100 is for illustrative purposes, it is understood that data communication network 100 may include additional elements not shown for clarity. In addition, although three wireless relays are shown, data communication network 100 may include more or fewer wireless relays in the same or another configuration.

In some examples, macro base station 101 may comprise an eNodeB. Although not required, wireless relays 122-124 may comprise femto-cell and pico-cell base stations. Examples of UEs 141-144 include wireless communication devices such as a telephone, cellular phone, mobile phone, smartphone, Personal Digital Assistant (PDA), laptop, computer, e-book, eReader, mobile Internet appliance, or some other wireless communication device with a wireless transceiver—including combinations thereof.

In operation, macro base station 101 wirelessly broadcasts frequency list 111. In some examples frequency list comprises a list of bands in the GHz range or MHz wide channels. Wireless relays 122-124 monitor frequency list 111 to determine if their associated frequencies 132-134 are included in frequency list 111. For example, wireless relays 122-124 may check a frequency table and compare the frequencies broadcasted in the frequency list with the frequencies listed in the frequency table.

If one or more of wireless relays 122-124 determines its associated wireless relay frequency 132-134 is not included in frequency list 111, then wireless relay 122-124 transfers a message to macro base station 101 to add its frequency 122-124. In some examples, the missing wireless relay frequencies are added by directing macro base station 101 to run a script. In other examples, the missing frequencies are manually added. Wireless relays 122-124 may be moved to a new location and need to be added to the frequency list of macro base station 101. In other examples, wireless relays 122-124 comprise new frequencies introduced in a location, and the new frequencies need to be added to frequency list 111.

Figure 2:
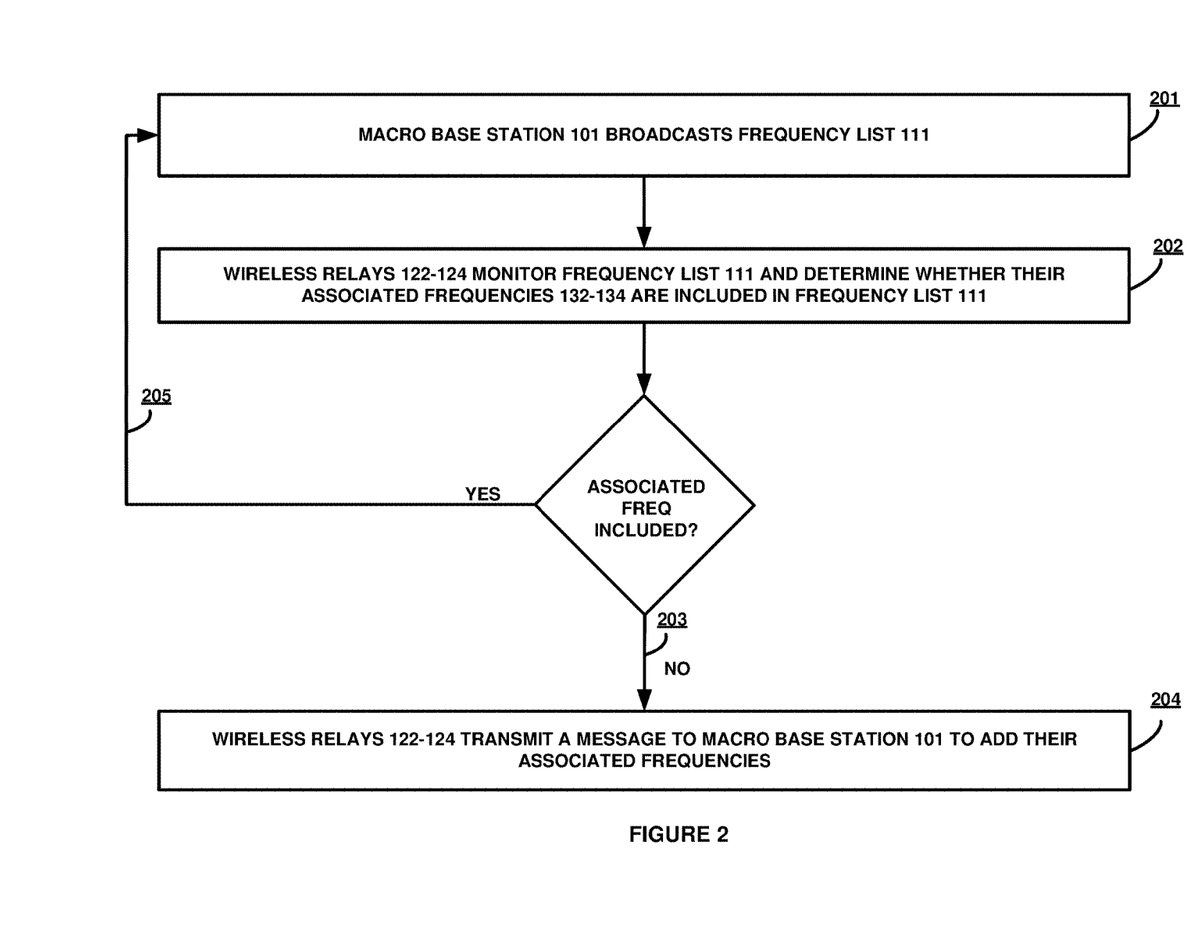
FIG. 2 illustrates the operation of the data communication network to manage the frequency list.

FIG. 2 illustrates the operation of data communication network 100 to manage frequency list 111. Macro base station 101 wirelessly broadcasts frequency list 111 (step 201). In some examples, frequency list 111 is broadcast in Long Term Evolution (LTE) System Information Blocks (SIBs). Wireless relays 122-124 monitor frequency list 111 to determine if their associated wireless relay frequencies 132-134 are included in frequency list 111 (step 202). For example, wireless relays 122-124 may scan for LTE SIBs broadcasted by macro base station 101 to identify frequency list 111.

If one or more of wireless relays 122-124 determines its associated frequency 132-134 is not included in frequency list 111 (step 203), then wireless relay 122-124 transfers a message to macro base station 101 to add its frequency 122-124 (step 204). Although not required, macro base station 101 and/or wireless relays 122-124 may generate an alarm when it is determined that an associated wireless relay frequency 132-134 is missing from frequency list 111. In some examples, the alarm comprises an indicator light. In other examples, the alarm may comprise a GUI display or icon that is activated when its associated frequency is missing from frequency list 111. If wireless relays 122-124 determine its associated frequency 132-134 is included in frequency list 111 (step 205), then macro base station 101 continues to broadcast frequency list 111 and the process continues.

Figure 3:
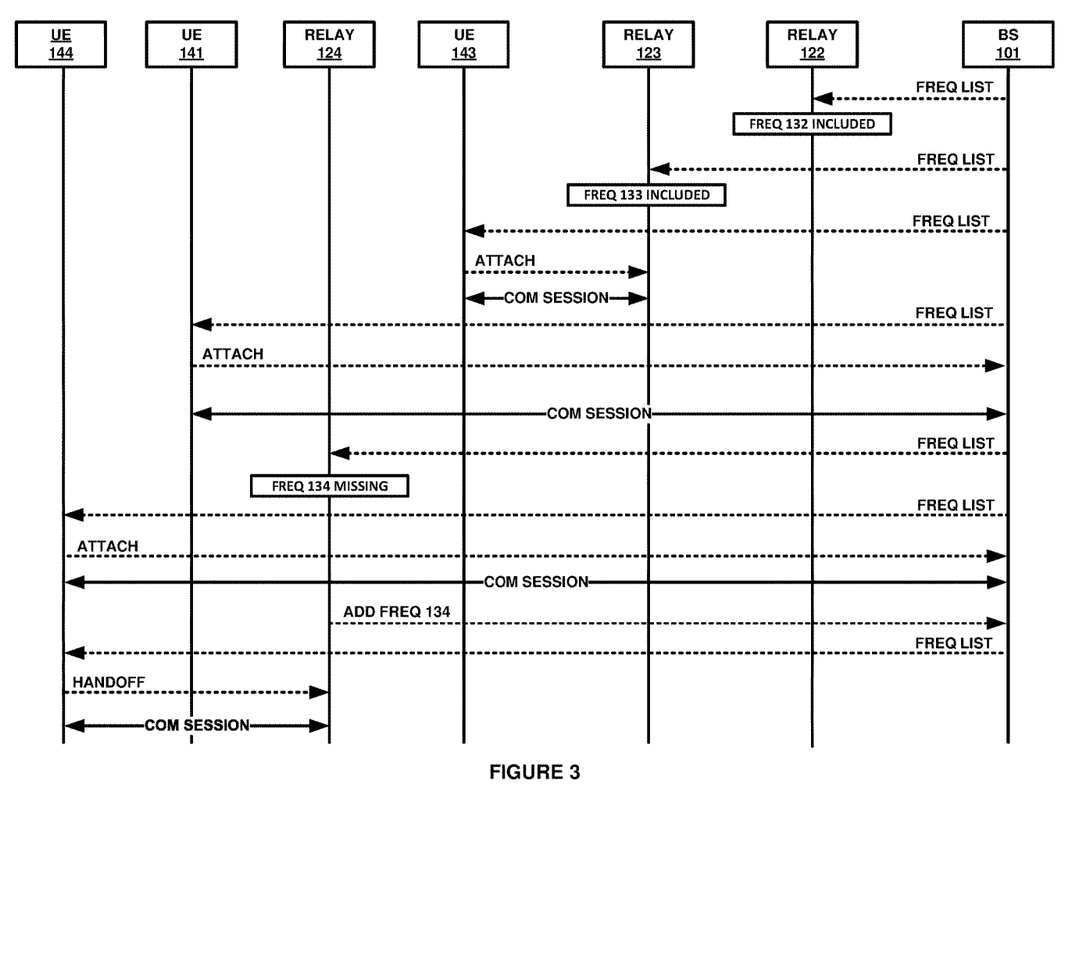
FIG. 3 illustrates the operation of the data communication network to manage the frequency list.

FIG. 3 illustrates the operation of data communication network 100 to manage frequency list 111. Marco base station 101 wireless broadcasts frequency list 111 to wireless relay 122. Wireless relay 122 determines that its associated frequency 132 is included in frequency list 111. Macro base station 101 broadcasts frequency list 111 to wireless relay 123, wireless relay 123 determines its associated frequency 133 is included in frequency list 111.

Macro base station 101 also broadcasts frequency list 111 to UE 143, UE processes frequency list 111 and determines that it should attach to wireless relay 123. For example, UE 143 may process frequency list 111 to pick the access point with the strongest RF signal. In other examples, UE 143 may pick an access point based on location or network load. UE 143 sends an attach request to wireless relay 123 and starts a communication session with wireless relay 123. UE 141 also receives frequency list 111 and selects macro base station 101 for attachment.

Wireless relay 124 scans for frequency list 111 broadcasted by macro base station 101. Wireless relay processes frequency list 111 to determine whether its associated frequency 134 is included. Wireless relay 124 determines that its associated frequency 134 is missing from frequency list 111. Before wireless relay 124 can send a message to macro base station 101, UE 144 scans its location for attachment and reads frequency list 111, which does not include a frequency for wireless relay 124. Therefore, although UE 144 is closer to wireless relay 124 and should have a stronger RF signal, UE 144 attaches to macro base station 101. Subsequently, macro base station 101 receives the message from wireless relay 124 indicating that frequency 134 is missing and needs to be added to frequency list 111. Macro base station adds frequency 134 to frequency list 111. Upon rescanning, UE 144 detects frequency 134 and hand-offs to wireless relay 124.

Figure 4:
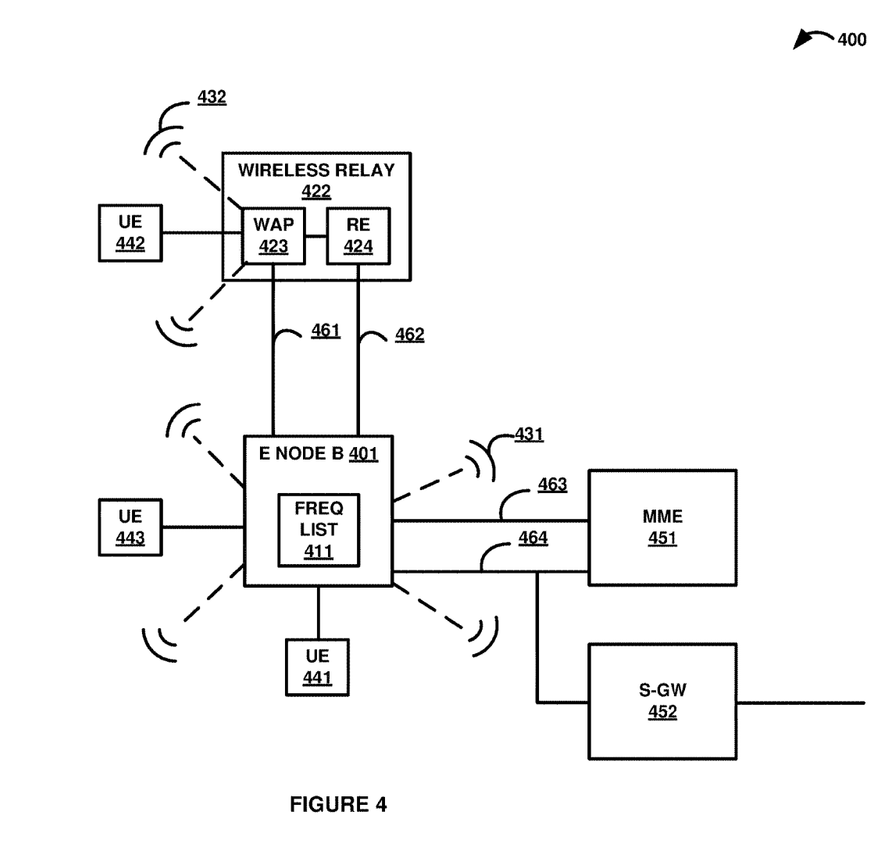
FIG. 4 illustrates a Long Term Evolution (LTE) communication network to manage a frequency list.

FIG. 4 illustrates the operation of LTE communication network 400 to manage frequency list 411. LTE communication network 400 includes eNodeB 401, wireless relay 422, UEs 441-443, Mobility Management Entity (MME) 451, and Serving Gateway (S-GW) 452. Wireless relay 422 includes wireless access point (WAP) 423 and relay equipment (RE) 424, and broadcasts over frequency 432. In some examples, WAP 423 comprises a UE adapted to serve other UEs. eNodeB 401 broadcasts over frequency 431 and includes frequency list 411. UEs 441 and 443 are attached to eNodeB 401. UE 432 is attached to wireless relay 422.

WAP 423 communicates with eNodeB 401 over communication link 461. In some examples, communication link 461 comprises an X2 link. RE 424 communicates with eNodeB 491 over communication link 462, which may comprise a Radio Resource Control (RRC) link. WAP 423 and RE 424 communicate with MME 451 over communication link 463, which may comprise a Non Access Stratum layer and/or an S1 interface. eNodeB 401 communicates with MME 451 over backhaul link 464.

In operation, RE 424 queries WAP 423 about its associated frequencies. For example, WAP 423 may be using two frequencies, one for an uplink channel and another for a downlink channel. In some examples, the query is upon boot up of wireless relay 422. In other examples, WAP 423 may report its associated frequency to RE 424. eNodeB 401 wirelessly broadcasts frequency list 411 in LTE SIBs. RE 424 monitors the LTE SIBs and determines whether WAP frequency 432 is included in the LTE SIBs. If WAP frequency 432 is not detected in the LTE SIBs, then RE 424 may transfer a message to eNodeB 401 over RRC 462.

In another example, RE 424 may transfer a message to MME 451 using NAS over communication link 463, and MME 451 informs eNodeB 401 of the missing WAP frequency 432 over an S1 interface. In yet another example, RE 424 may transfer a message or indication to WAP 423 indicating that WAP frequency 432 is not detected. WAP 423 in turn, sends a message over X2 connection 461 to eNodeB 401 indicating that WAP frequency 432 is not detected. In yet another example, RE 424 transfers the message to WAP 423 indicating that WAP frequency 432 is not detected, WAP 423 sends a message to MME 451, and MME 451 notifies eNodeB 401. Although not required, eNodeB 401 may request RE 424 to report associated frequency information, and eNodeB 401 determines whether associated wireless relay frequency 432 is included in its frequency list.

Figure 5:
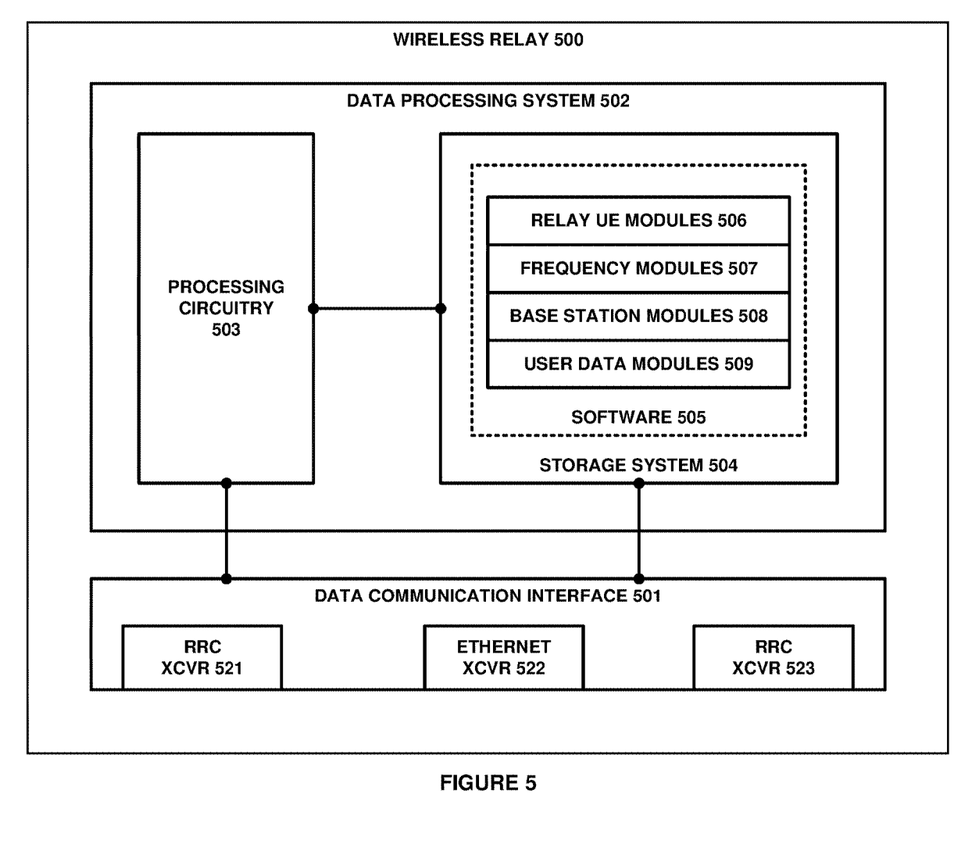
FIG. 5 illustrates an example of a wireless relay.

FIG. 5 illustrates wireless relay 500. Wireless relay 500 is an example of wireless relays 122-124 and 422. Although these systems may use alternative configurations and operations. Wireless relay 500 comprises data communication interface 501 and data processing system 502. Data communication interface 501 comprises RRC transceiver 521, Ethernet transceiver 522, and RRC transceiver 523. Data processing system 502 comprises processing circuitry 503 and storage system 504. Storage system 504 stores software 505. Software 505 includes respective software modules 506-509.

Transceivers 521-523 comprise communication components, such as antennas, amplifiers, filters, modulators, ports, bus interfaces, digital signal processors, memory, software, and the like. Processing circuitry 503 comprises circuit boards, bus interfaces, integrated micro-processing circuitry, and associated electronics. Storage system 504 comprises non-transitory, machine-readable, data storage media, such as flash drives, disc drives, memory circuitry, data servers, and the like. Software 505 comprises machine-readable instructions that control the operation of processing circuitry 503 when executed. Wireless relay 500 may be centralized or distributed. All or portions of software 506-509 may be externally stored on one or more storage media, such as circuitry, discs, and the like. Some conventional aspects of wireless relay 500 are omitted for clarity, such as power supplies, enclosures, and the like.

When executed by processing circuitry 503, software modules 506-509 direct circuitry 503 to perform the following operations. Relay UE modules 506 direct RRC transceiver 523 to interact with donor eNodeBs. Frequency modules 507 direct processing system 502 to scan for a frequency list broadcasted by a donor eNodeB and determine whether the wireless relay's associated frequency is included in the frequency list. Base station modules 508 direct RRC transceiver 521 to interact with UEs. User data modules 509 exchange user data between transceivers 521-523.

Figure 6:
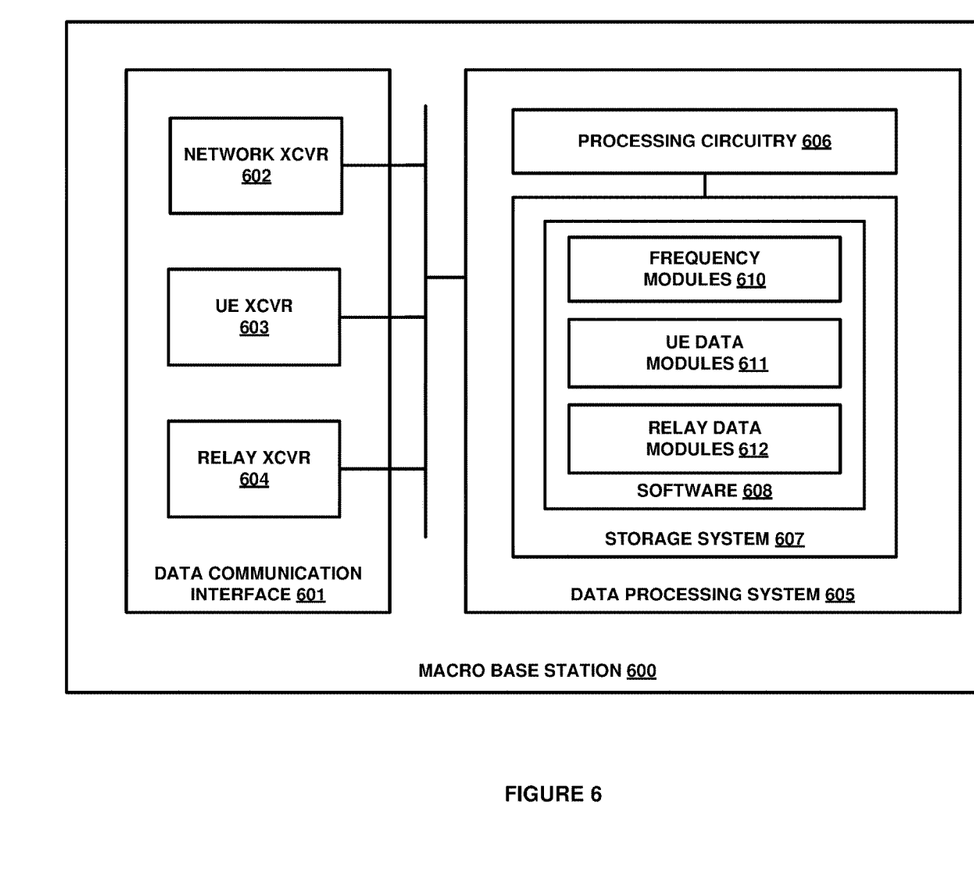
FIG. 6 illustrates an example of a macro base station to manage a frequency list.

FIG. 6 illustrates wireless access point 600 to manage a frequency list. Wireless access point 600 is an example of macro base station 101 and eNodeB 401. Although these systems may use alternative configurations and operations. Wireless access point 600 comprises data communication interface 601 and data processing system 605. Data processing system 605 includes processing circuitry 606 and storage system 607 that stores software 608. Software 608 comprises software modules 610-612.

Data communication interface 601 comprises network transceiver 602, UE transceiver 603, and relay transceiver 604. Network transceiver 602 allows wireless access point 600 to communicate with a wireless communication network. UE transceiver 603 allows wireless access point 600 to communicate directly with UEs. Relay transceiver 604 allows wireless access point 600 to communicate with wireless relays, such as wireless relays 122-124 and 422.

Data communication interface 601 components that communicate over communication links such as network cards, ports, RF transceivers, processing circuitry and software, or some other communication components. Data communication interface 601 may be configured to communicate over metallic, wireless, or optical links. Data communication interface 601 may be configured to use TDM, IP, Ethernet, optical networking, wireless protocols, communication signaling, or some other communication format—including combinations thereof. Data communication interface 601 may receive and transfer user communication data over the uplink and downlink communication channels, respectively.

Processing circuitry 606 comprises microprocessor and other circuitry that retrieves and executes operating software 608 from memory 607. Processing circuitry 606 may comprise a single device or could be distributed across multiple devices—including devices in different geographic areas. Processing circuitry 606 may be embedded in various types of equipment. Examples of processing circuitry 606 include central processing units, application specific processors, logic devices, and/or any type of computer processing devices—including combinations thereof.

Storage system 607 comprises a non-transitory computer readable storage medium readable by processing system 606 and capable of storing software 608, such as a disk drive, flash drive, data storage circuitry, or some other hardware memory apparatus—including combinations thereof. Storage system 607 can include volatile and/or non-volatile, removable and non-removable media implemented in any method or technology for storage of information, such as computer readable instructions, data structures, program modules, or other data—including combinations thereof. Storage system 607 may comprise a single device or could be distributed across multiple devices—including devices in different geographic areas. Storage system 607 may be embedded in various types of equipment. In some examples, a computer apparatus could comprise storage system 607 and software 608.

Software 608 comprises computer programs, firmware, or some other form of machine-readable processing instructions. Software 608 may include an operating system, utilities, drivers, network interfaces, applications, or some other type of software. In this example, software 608 comprises interference module 609, transmit power module 610, UE data module 611, and repeater data module 612. Although software 608 could have alternative configurations in other examples. Software 608 may be implemented in program instructions and may be executed by processing circuitry 606. Software 608 may include additional processes, programs, or components, such as operating system software, database software, or application software—including combinations thereof. Software 608 may also comprise firmware or some other form of machine-readable processing instructions executable by processing circuitry 606.

When executed, software 608 directs processing circuitry 606 to operate as described herein to manage a frequency list. In particular, frequency module 610 directs processing circuitry 606 to scan for a frequency list and determine if the associated frequency is included on the frequency list. UE data module 611 directs processing circuitry 606 to transmit user data with UEs. Relay module 612 directs processing circuitry 606 to transmit user data with wireless relays.

Referring back to FIG. 1, UEs 141-144 comprise Radio Frequency (RF) communication circuitry and an antenna. The RF communication circuitry typically includes an amplifier, filter, modulator, and signal processing circuitry. UEs 141-144 may also include a user interface, memory device, software, processing circuitry, or some other communication components. UEs 141-144 may be a telephone, computer, e-book, mobile Internet appliance, wireless network interface card, media player, game console, or some other wireless communication apparatus—including combinations thereof.

Macro base station 101 comprises RF communication circuitry and an antenna. The RF communication circuitry typically includes an amplifier, filter, RF modulator, and signal processing circuitry. Macro base station 101 may also comprise a router, server, memory device, software, processing circuitry, cabling, power supply, network communication interface, structural support, or some other communication apparatus. Macro base station 101 could be a base station, eNodeB, wireless repeater, Internet access node, telephony service node, wireless data access point, or some other wireless communication system—including combinations thereof.

Wireless relays 122-124 comprise RF communication circuitry and an antenna. The RF communication circuitry typically includes an amplifier, filter, RF modulator, and signal processing circuitry. Wireless relays 122-124 may also comprise a router, server, memory device, software, processing circuitry, cabling, power supply, network communication interface, structural support, or some other communication apparatus. Wireless relays 122-124 could be a femto-cell base station, pico-cell base station, WIFI hotspot, or some other wireless access point—including combinations thereof.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data communication network that comprises a macro base station and a plurality of wireless relays that serve User Equipment (UE), the method comprising:
the macro base station wirelessly broadcasting a frequency list;
the plurality of wireless relays monitoring the frequency list and
each individual wireless relay determining whether their associated wireless relay frequency is included in the frequency list; and
if their associated wireless relay frequency is not included in the frequency list,
then the individual wireless relay transmitting a message for delivery to the macro base station and generating an alarm.

2. The method of claim 1 further comprising the plurality of wireless relays receiving wireless UE attachments responsive to macro base station wirelessly broadcasting their associated wireless relay frequencies in the frequency list.

3. The method of claim 1 wherein the macro base station wirelessly broadcasting the frequency list comprises the macro base station broadcasting the frequency list in Long Term Evolution (LTE) System Information Blocks (SIBs).

4. The method of claim 1 wherein the macro base station comprises a Long Term Evolution (LTE) eNodeB.

5. The method of claim 1 wherein the individual wireless relays of the plurality of wireless relays include a wireless access point and relay equipment and wherein the wireless access point communicates with the UEs using the associated wireless relay frequency.

6. The method of claim 5 wherein the plurality of wireless relays monitoring the frequency list comprises the relay equipment scanning Long Term Evolution (LTE) System Information Blocks (SIB s) broadcasted by the macro base station and wherein determining whether their associated wireless relay frequency is included in the frequency list comprises processing the LTE SIBs to determine whether the associated wireless relay frequency is included in the LTE SIBs.

7. The method of claim 6 further comprising:
the relay equipment determining that the associated wireless relay frequency is not included in the LTE SIB s and transferring a message for delivery to the macro base station indicating that the associated wireless relay frequency is not detected in the LTE SIBs.

8. The method of claim 6 further comprising:
the relay equipment determining that the associated wireless relay frequency is not included in the LTE SIBs and transferring a message for delivery to the wireless access point indicating that the associated wireless relay frequency is not detected in the LTE SIBs.

9. The method of claim 6 further comprising:
the relay equipment determining that the associated wireless relay frequency is included in the LTE SIBs and transferring a message for delivery to the wireless access point indicating that the associated wireless relay frequency is detected in the LTE SIBs.

10. The method of claim 6 further comprising:
the relay equipment determining that the associated wireless relay frequency is not included in the LTE SIBs and generating an alarm.

11. A data communication network that comprises a macro base station and a plurality of wireless relays that serve User Equipment (UE), the data communication network comprising:
the macro base station configured to wirelessly broadcast a frequency list;
the plurality of wireless relays configured to monitor the frequency list and
each individual wireless relay configured to determine whether its associated wireless relay frequency is included in the frequency list; and
if its associated wireless relay frequency is not included in the frequency list,
then the individual wireless relay configured to transfer a message for delivery to the macro base station and generating an alarm.

12. The data communication network of claim 11 further comprising the plurality of wireless relays configured to receive wireless UE attachments responsive to macro base station wirelessly broadcasting their associated wireless relay frequencies in the frequency list.

13. The data communication network of claim 11 wherein the macro base station is configured to wirelessly broadcast the frequency list in Long Term Evolution (LTE) System Information Blocks (SIBS).

14. The data communication network of claim 11 wherein the macro base station comprises a Long Term Evolution (LTE) eNodeB.

15. The data communication network of claim 11 wherein the individual wireless relays of the plurality of wireless relays include a wireless access point and relay equipment and wherein the wireless access point is configured to communicate with the UEs using the associated wireless relay frequency.

16. The data communication network of claim 15 wherein the plurality of wireless relays are configured to scan Long Term Evolution (LTE) System Information Blocks (SIBs) broadcasted by the macro base station and process the LTE SIBs to determine whether the associated wireless relay frequency is included in the LTE SIBs.

17. The data communication network of claim 16 further comprising:
the relay equipment configured to determine that the associated wireless relay frequency is not included in the LTE SIBs and transfer a message for delivery to the macro base station indicating that the associated wireless relay frequency is not detected in the LTE SIBs.

18. The data communication network of claim 16 further comprising:
the relay equipment configured to determine that the associated wireless relay frequency is not included in the LTE SIBs and transfer a message for delivery to the wireless access point indicating that the associated wireless relay frequency is not detected in the LTE SIBs.

19. The data communication network of claim 16 further comprising:

the relay equipment configured to determine that the associated wireless relay frequency is included in the LTE SIBs and transfer a message for delivery to the wireless access point indicating that the associated wireless relay frequency is detected in the LTE SIBs.

20. The data communication network of claim 16 further comprising:

the relay equipment configured to determine that the associated wireless relay frequency is not included in the LTE SIBs and generate an alarm.

* * * * *